Jan. 10, 1967   J. SEIDERMANN   3,296,835
UNIVERSAL JOINT
Filed June 30, 1965   5 Sheets-Sheet 1
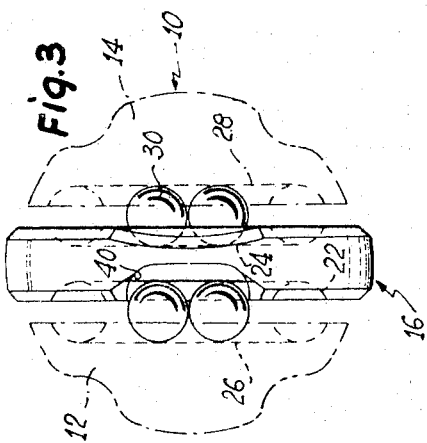
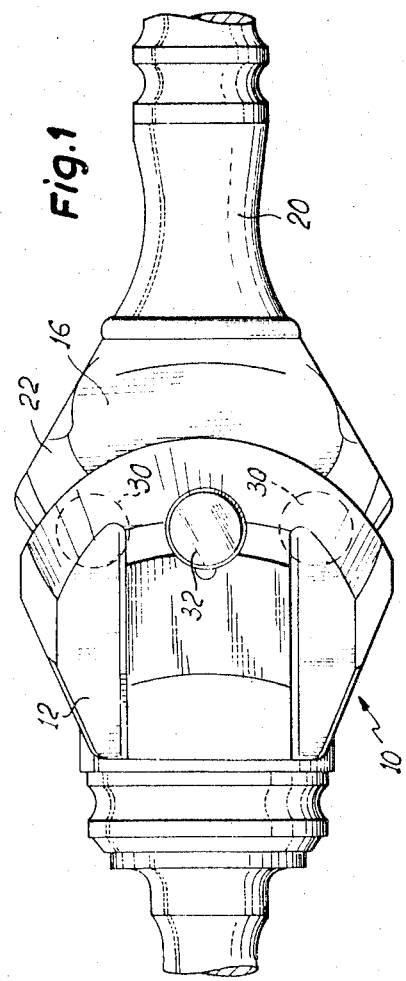
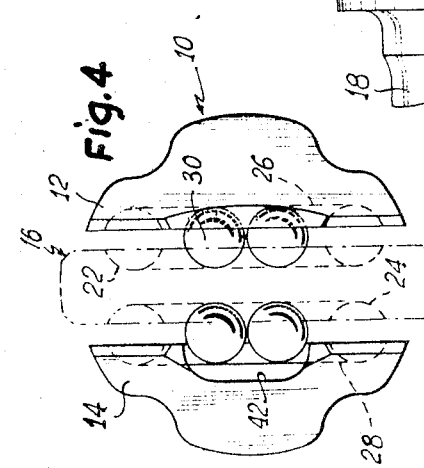
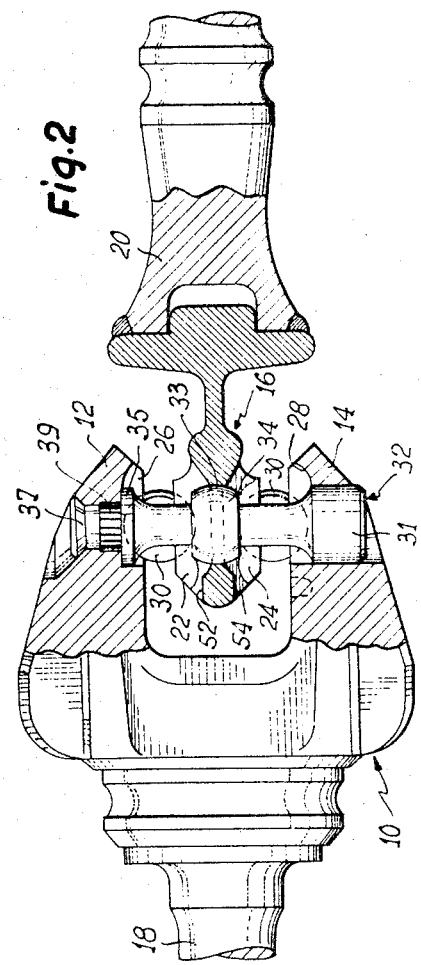

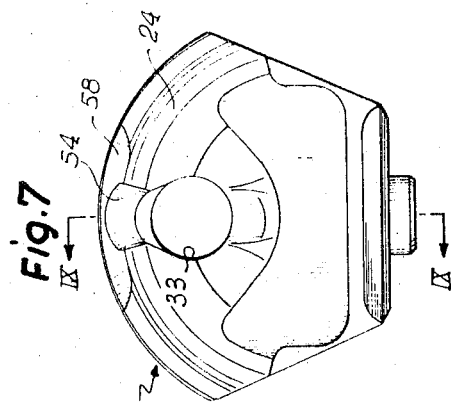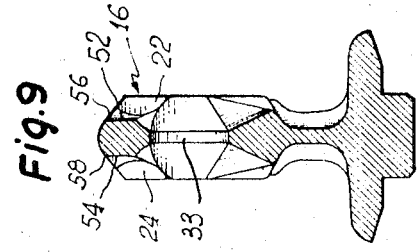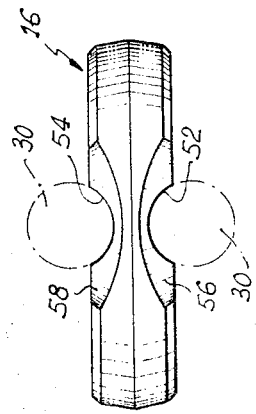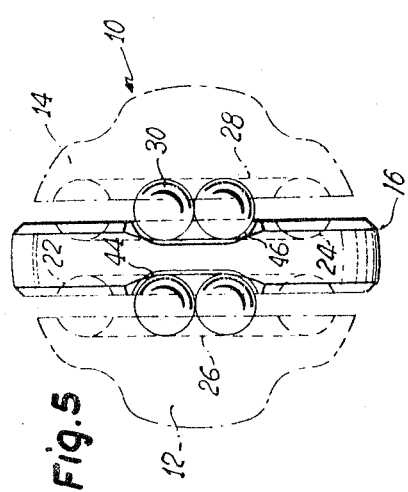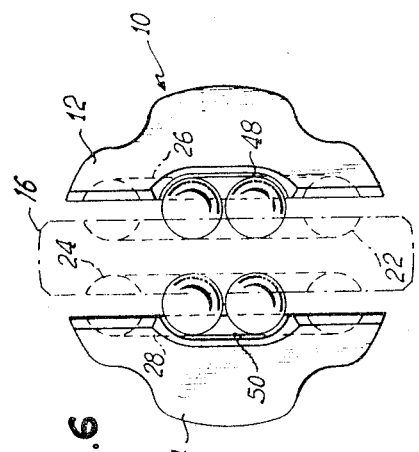

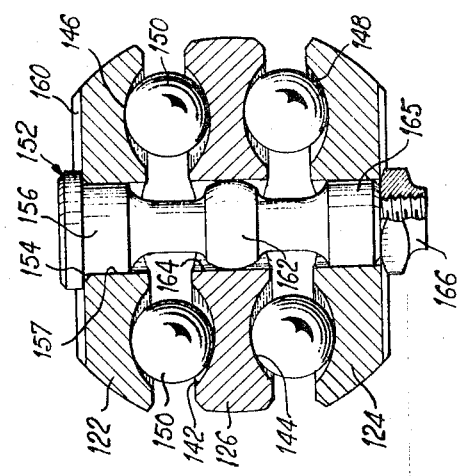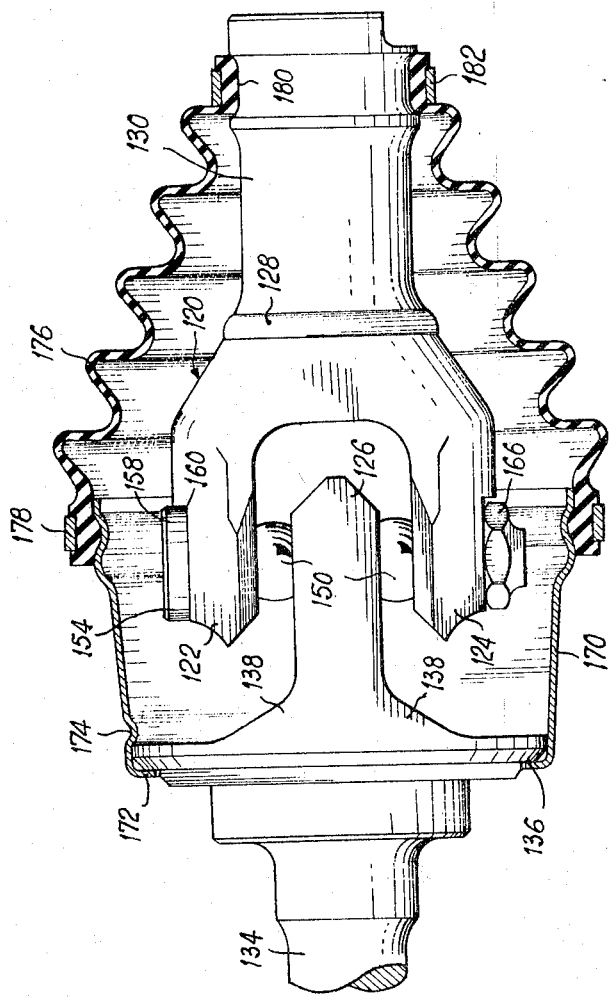

United States Patent Office 3,296,835
Patented Jan. 10, 1967

3,296,835
UNIVERSAL JOINT
Jacques Seidermann, Livry-Gargan, France, assignor to Societe Anonyme D.B.A., Paris, France, a company of France
Filed June 30, 1965, Ser. No. 468,322
Claims priority, application France, July 1, 1964, 980,376; June 18, 1965, 21,420
12 Claims. (Cl. 64—21)

The present invention relates to improvements in homokinetic universal joints. It concerns notably homokinetic joints used for transmitting torque between two shafts capable of being angularly moved with respect to each other, said joints generally comprising a plate inserted in a fork, two balls on each side of the plate, each ball engaging in a groove in the plate and a groove in an arm of the fork, the axis of a groove engaged by a ball intersecting symmetrically the axis of the other groove engaged by that ball in the plane including the axis about which the shafts are movable with respect to one another and bisecting the angle between the shaft axes.

During the mounting operation of a homokinetic joint of the aforesaid type the stiffness of the articulation is adjusted within closed limits to obtain the exact degree of coupling of the whole assembly. In the known devices, the fork may be dismounted so as to permit insertion of the balls between said fork and the aforesaid plate. The fork is given a certain flexibility so that a member provided with abutments and a convenient clamping means is necessary to define the opening of the fork to obtain the exact degree of coupling of the joint upon action on said clamping means. The member comprising the said abutments generally comprises calibrated washers, the thickness of which is chosen so as to obtain the correct clamping corresponding to the machining of the grooves and to the diameters of the balls. The abutment carrying member thus forms a transverse spacing element generally used to carry a spherical bearing for engagement by the plate through which said transverse element extends such an arrangement being suitable for high loads tending to separate or close the two parts of the joint.

The construction of the known joints of the aforesaid type involve machining steps which are numerous, difficult to be carried out and resulting in a costly construction. The mounting of such a joint is executed in the form of a step-by-step operation consisting of an adjustment of a stiffness of the joint obtained by a judicious choice of the calibrated washers. Of course, since the washers are located close to the opposite faces of the fork, the stiffness testing operation on the joint involves a complete dismounting of said joint and such operations have to be carried out until a correct degree of stiffness has been obtained.

The joint according to the present invention is such that it may be machined in a more simpler way than known joints and its mounting operation is very easy to be carried out.

The universal homokinetic joint of the invention comprises a plate inserted in a fork, two balls on each side of the plate, each ball engaging in a groove in the plate and a groove in an arm of the fork, a central spherical pivot mounted on the fork being retained substantially centrally of the plate by means of a spherical sealing adapted to withstand loads which tend to separate or close the parts of the joint.

The joint is characterized in that the fork and the plate are solid elements integral with or welded to their respective shaft and in that at least a frontal cutting or slot is provided at the periphery of at least one of the faces of the plate and/or of the fork, said cutting or slot merging into at least one of the grooves and having a size permitting the insertion of the plate into the fork and the introduction of the balls in their respective grooves.

According to another feature of the invention the plate which is substantially semi-circular is connected to its shaft by a reinforced portion, said portion being adjacent to a disc which is coaxial to said shaft, and carries the rigid sleeve and flexible convoluted enclosure containing the lubricant of the joint.

Other characterizing features of the invention will appear in the following description in which reference is made to the annexed drawings in which:

FIG. 1 is a plan view showing a homokinetic joint according to the invention;

FIG. 2 shows the joint of FIG. 1 in side view with parts partially broken away;

FIGS. 3 to 6 show different embodiments relating to the cuttings or slots provided for the insertion of the balls;

FIGS. 7 to 9 are plane view, front view, and lateral cross-sectional view respectively of the plate to be inserted into the fork of a joint according to the invention, said plate comprising slots permitting the introduction of the balls one to the other;

FIG. 15 is a lateral view of the joint of FIG. 14; and

FIG. 16 is a transversal cross-sectional view showing the location of the balls between the fork and the plate of the joint of FIGS. 14 and 15.

Figure 13:
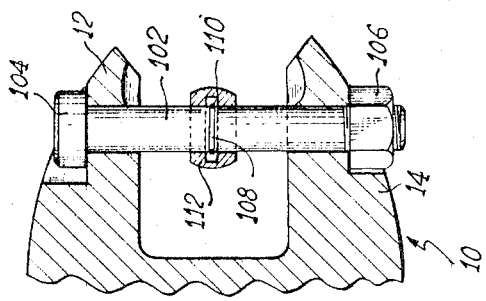
FIGS. 10 to 13 show different modifications of members provided to carry the spherical bearing element and which can be used with the joint according to the invention.

As represented in plane view and in side view with parts partially broken away in FIGS. 1 and 2 respectively, the joint according to the invention comprises a fork 10 between the arms 12 and 14 of which is inserted a plate 16. The free ends of fork 10 and of plate 16 respectively are cylindrical and welded, in the illustrated example, to shafts 18 and 20, respectively. However, it is obvious that, in certain cases, the shafts 18 and 20 could be integral with the fork 10 and plate 16 respectively.

As better shown in FIG. 2, circular grooves 22 and 24 have been machined in the opposite faces of plate 16. Substantially similar grooves have been machined at 26 and 28 respectively in the adjacent walls of arms 12 and 14 of fork 10. Four balls 30 are located in the aforesaid grooves, they are maintained at the intersection between said grooves at a certain distance from plane of symmetry of the joint in aligned condition. In FIG. 1, the position of the balls has been shown in phantom line. The insertion of the balls is executed through at least one cutting or slot merging into at least one of the grooves as will be explained hereinafter.

There has been provided to insert, in a known per se manner, a pin carrying a spherical bearing element between the fork and plate assemblies 10 and 16. This spherical bearing element generally designated by reference 32 extends on the one hand through arms 12 and 14 of fork 12 and on the other hand through a bore 33 provided in plate 16. The median portion of the pin 32 is provided with spherical surface 34 cooperating with the lateral wall of bore 33 of plate 16. It is obvious that the pin 32 carrying the spherical element 34 is in no way used to provide a given stiffness of the joint because of the solid unitary fork 10. Some kinds of pin carrying spherical bearing surfaces usable with the unitary non-deformable fork 10 of FIGS. 1 and 2 will be described hereinafter.

With reference to FIGS. 3 to 6 there will be now described a certain number of embodiments of the invention relating the different types of frontal slots through which it is possible to insert plate 16 into fork 10 and balls 30 in their respective grooves.

In FIGS. 3 to 6, there has been diagrammatically shown, in solid line, frontal views of plate 16 (FIGS. 3 and 5) and fork 10 (FIGS. 4 and 6) and there has been shown in phantom line plate 16 (FIGS. 4 and 6) and fork 10 (FIGS. 3 and 5) superposing the parts in phantom line seen above the plane of the drawings. Such a way representing the different parts permitting representing by means of a solid line the different types of slots and by means of dotted lines the different grooves except where said grooves may be seen directly at the bottom of the slot connecting them to the peripheral edge of the respective slotted parts. The different drawings of FIGS. 3 to 6 show the balls located in their respective grooves ready to roll in said grooves to be moved to the positions in which they are represented in phantom line in FIG. 1, said FIG. 1 corresponding to the alignment of the different bores through which extends pin 32.

In FIGS. 3 to 6 the same reference numerals have been used to designate the elements already referenced in FIGS. 1 and 2, i.e.: fork 10 and the arms 12 and 14 thereof, plate 16, grooves 22 and 24 on the one hand and 26 and 28 on the other hand, provided on the plate 16 and fork 10 respectively as well as balls 30 which are located in said grooves.

In the embodiment shown in FIG. 3, a slot 40 is provided in the face of plate 16 in which has been machined groove 22. As shown in the drawing the depth of groove 40 is at least equal to the total of the depths of grooves 22 and 24 (or, in other words, in the illustrated example, to the total of the depths of grooves 26 and 28 which have the same depth). The slot 40, the edges of which are round has a size such that it is possible to insert through it two balls 30 located one close to the other. The size of slot 40 being such as defined hereinbefore, it is obvious that it is possible to insert plate 16 into fork 10, the latter carrying four balls 14 located two by two, one close to the other, as illustrated in the drawing of FIG. 3. It is also possible to move fork 10 on plate 16 carrying two balls located at the bottom of slot 40, the two other balls being located in groove 24, side by side, symmetrically with respect to the plane of symmetry of the joint.

In the embodiment of FIG. 4, there has been provided a frontal slot 42 provided in arm 14 of fork 10 to connect the peripheral edge of said arm 14 to groove 28. The size of groove 42 is substantially similar to the size of the aforesaid slot 40. The balls 30 being at the bottom of slot 42 and groove 26 respectively, it is obvious that plate 16 may be easily inserted thus accomplishing the mounting of the joint. This mounting of the joint may also be obtained by inserting plate 16 on which are located balls 30 with a slight translatory motion during the insertion, said slight translation bringing the outermost left edges of the balls at the left in contact with the bottom of groove 42 and being followed by another translatory motion of plate 16 bringing the latter in the position in which it is shown in FIG. 4.

In the embodiment illustrated in FIG. 5, there has been provided two slots 44 and 46 the total depth of which is substantially equal to each of the depths of slots 40 and 42 already mentioned. As in the illustrated example, grooves 22, 24, 26 and 28 are substantially of the same depth, the slots 44, 46 are each of a depth which is at least equal to the depth of said slots as shown in the drawing. When considering this drawing, it is obvious that the insertion of plate 16 into fork 10 is easily obtained by maintaining balls 30 in grooves 26 and 28 of fork 10 and thus axially moving plate 16 until the balls are located at the level of their respective grooves.

In the embodiment of FIG. 6, slots 48 and 50 having substantially the same shape as slots 44 and 46 have been provided in the arms 12 and 14 respectively. Such slots 48 and 50 merging into grooves 26 and 28 of fork 10. One can easily imagine the mounting of the joint FIG. 6 which is obtained by slipping in fork 10 onto plate 16 carrying the balls 30 located side by side, two by two, in the grooves 22 and 24 respectively, as shown in the drawings.

When considering again in FIGS. 3 and 4, it is obvious that on the one hand slot 40 could have been provided to merge into groove 24 instead of groove 22 and that on the other hand slot 42 could have been easily provided to merge into groove 26 instead of merging into groove 28.

One can also easily imagine that within the scope of the invention, there is provided the insertion of plate 16 into fork 10 together with balls 30, by provision of slots having a convenient depth provided in fork 10 and plate 16 as well respectively.

It is obvious that balls 30 are located in their respective rolling tracks defined by the slots, when the plate is pushed into the fork, said balls 30 which are to be maintained at the intersection of the circular grooves in which they are located will move away from the plane of symmetry of the joint while the plate moves into the fork. This inward motion will be caused to cease when the axial alignment of the balls of fork 10 and of plate 16 will be obtained thus permitting the insertion of the pin 32 carrying the spherical bearing surface.

In FIGS. 7 and 9, there has been represented in plane view, in front view, in cross-sectional view along line 9—9 of FIG. 7 respectively, a plate forming element which is similar to the one represented in FIGS. 1 and 2. Plate element 16 shown in FIGS. 7 to 9 distinguishes over the plate elements, of FIGS. 3 to 6 in that it comprises two slots, one on each of its faces, the widths of said slots being of limited size so as to permit not to cut out too much of the grooves in which are located the balls. In the embodiment of FIGS. 7 to 9, reference numerals 52 and 54 designate slots connecting grooves 22 and 24 respectively with the peripheral frontal edges of plate 16. These slots are of a size such that they each permit the passage of only one ball. As shown in the drawing, slots 52 and 54 terminate in two bevelled planes located substantially at 45° with respect to the plane of symmetry of the plate. Those two bevelled planes designated by reference numerals 56 and 58 are provided so that the plate 16 does not engage the internal faces of fork 10 when the joint is in its maximum shifted condition.

The plate 16 being machined as illustrated in FIGS. 7 to 9, the insertion of the balls is executed as follows; one ball is located in each of the two grooves of the fork at any point of said grooves, the two balls being superposed so that they have a common axis perpendicular to the plate. Plate 16 is thus introduced between the balls thanks to the two slots 52 and 54 provided in said plate 16. The joint thus formed is shifted about the common axis of the two balls after engagement thereof, of an angle which is sufficient to make clear the two half-grooves of the fork which are still free from balls. The third and fourth balls are thus placed in superimposed condition one in each of the two half-grooves in the vicinity of the orifice 33 provided to receive the pin carrying the spherical bearing surface. Finally the joint is set in aligned condition by a new pivoting of plate 16 about the axis of the two first balls, the insertion of the third and fourth thus occurring through slots 52 and 54 provided in plate 16.

All the mounting operations of the joint described hereinbefore have been executed with forks and plates, the grooves of which have been milled with a very great accuracy. The balls that are used are duly calibrated balls selected to fit the dimensions of the forks and plates used to make the joints.

After the mounting operation has been executed, the operator controls the stiffness of the joint, for instance, by means of a calibrated spring scale. If the joint is too stiff, the operator changes the balls to smaller balls and inversely, if the joint is too loose, he changes the balls to larger balls. The mounting and dismounting of the joint being very quick, the time spent for this operation is substantially reduced all the more since generally the forks and plates respectively supplied by the same milling machine or the like may be mounted with balls having the same diameters.

With reference to FIGS. 2 and 10 to 13, there will be now described a certain number of pins carrying a spherical bearing surfaces advantageously used with unitary head element forming the fork of the joint of the invention.

Pin 32 of FIG. 2 is preferably machined as a unitary part. It comprises at one of its ends a cylindrical head 31 fitting a corresponding bore provided in arm 14 of fork 10. The diameter of the bore receiving head 31 is slightly larger than the one of the spherical bearing surface 34 carried by the pin 32. The end of pin 32 opposed to the one constituting head 31 comprises a shoulder 35 abutting a flat surface provided in the internal face of arm 12. Beyond shoulder 35 is provided a tubular portion 37 which is cylindrical at the origin when pin 32 is engaged in the respective bore and which is tapered in the form of a frustrum of a cone by a serration operation executed on the wedges of the tubular portion after the mounting has been executed. The portion of the outer wall of the tubular portion 37 adjacent to shoulder 35 is provided with a knurled surface 39 opposing the rotation of pin 32 when the external edges of the cylindrical portion have been serrated in the corresponding frusto-conical recess provided in the outer surface of arm 12. Pin 32 of FIG. 2 which has been just described is generally used for executing the "first mounting" in mass production. Such a pin may be changed, after repair, by another pin comprising, instead of the tubular end, a threaded end which is rendered solid with arm 12 by means of a nut having a frusto-conical portion cooperating with a frusto-conical surface of the recess provided in the outer surface of the arm 12.

Figure 10:
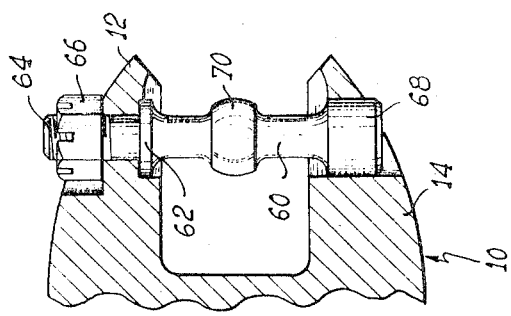

In FIG. 10 has been represented a pin 60, which is similar to pin 32 just described, said pin 60 being affixed to arm 12 by means of shoulder 62, a threaded end 64 and a slotted nut 66. As was the case with the pin 32 of FIG. 2, the diameter of the head 68 of pin 60 is larger than the diameter of the spherical bearing surface 70 carried by said pin 60.

Figure 11:
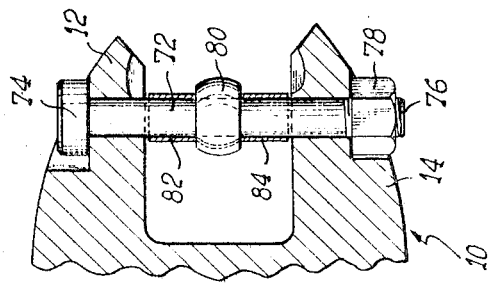

The pin illustrated in FIG. 11 comprises a bolt 72 having a head 74 taking support on the bottom of a recess provided in the external face of arm 12 and a threaded end 76 on which is threaded a nut 78 taking support on the bottom of a recess provided in the outer face of arm 14. The mechanical strength of fork 10 is such that the tightening of nut 72 on the threaded end 76 is not capable of modifying the shape of fork 10. During the mounting of bolt 72, a spherical bearing element 80 and two cylindrical sleeves 82 and 84 adjacent to said spherical bearing element 80 are slipped over on the bolt so as to be located between the arms 12 and 14. The total height of the spherical bearing element 80 and of the adjacent sleeves 82 and 84 is such the the spherical bearing element 80 is floating in the interior of fork 10.

Figure 12:
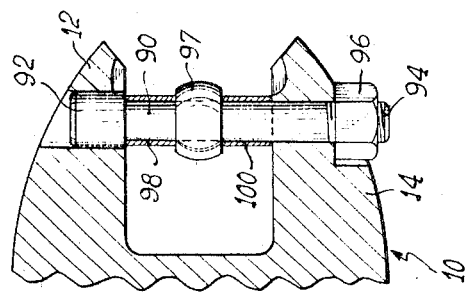

In a modification illustrated in FIG. 12, the pin carrying the spherical bearing surface consists of a screw 90 comprising a cylindrical head 92 and a threaded end 94 on which is mounted a nut 96. A spherical bearing element 97 is mounted on the body of the screw 90 between two cylindrical sleeves 98 and 100. The cylindrical head 92 fits in a bore provided in arm 12 of fork 10 throughout said arm 12 so that the spherical bearing elements 97 and the two sleeves 98 and 100 are clamped between head 92 and arm 14 upon threading of nut 96 on the threaded end of screw 90.

In FIG. 13 is shown another embodiment comprising a floating cylindrical bearing element mounted on a screw 102, the head 104 and a nut 106 of which abut the bottoms of recesses provided on the outer sides of arms 12 and 14 of fork 10 respectively. In an annular groove 108 machined in the wall of the body of screw 102 is mounted a snap ring 110 which retains with certain play a spherical bearing element 112 in floating relationship on screw 102, the annular space provided in the inner wall of spherical bearing element 112 being of a size larger than the external size of snap ring 110.

Figure 14:
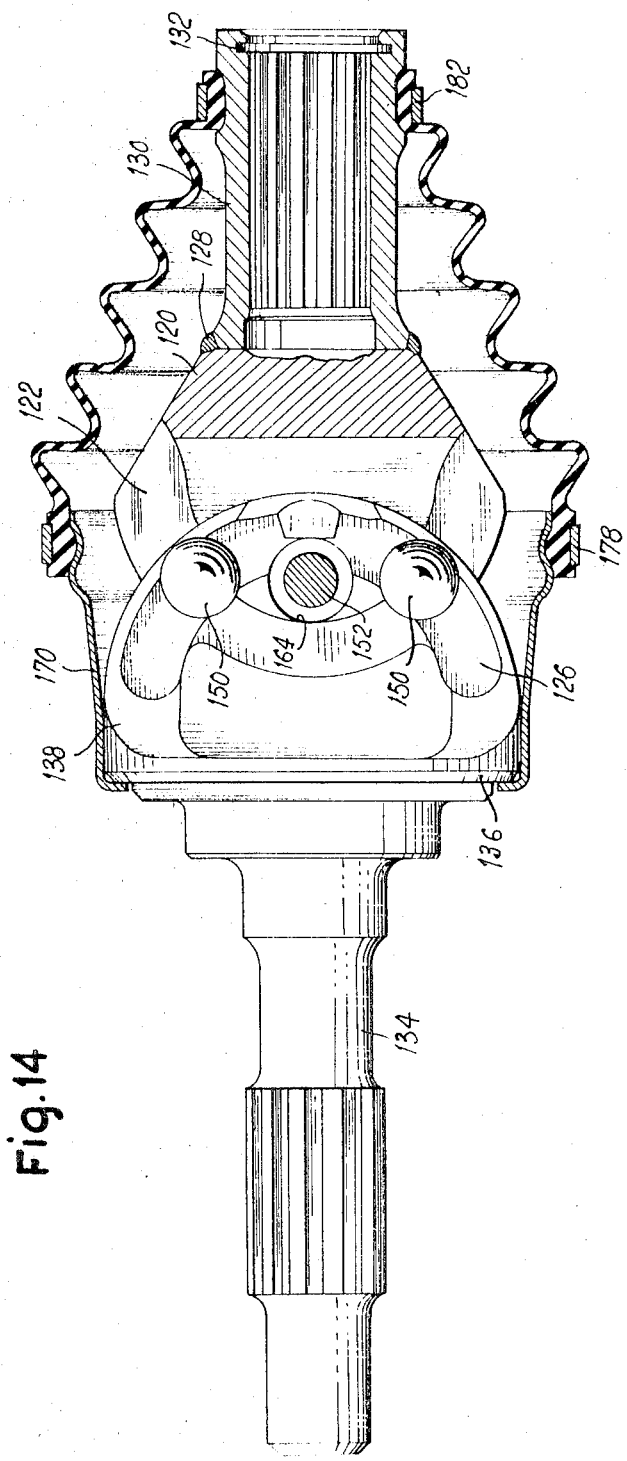
FIG. 14 is an axial cross-section of the homokinetic joint according to an embodiment comprising a protection casing mounted on plate with reinforcing means provided on said plate.

FIGS. 14 to 16 relate to an embodiment comprising the use of reinforcing means provided between the plate of the joint and its respective shaft, the disc solid with said shaft and coaxial thereto permitting the mounting of the external casing means of the joint.

The joint of FIGS. 14 to 16 comprise a fork 120 between the arms 122 and 124 of which is inserted a plate 126. Fork 120 is welded at 128 on an internally splined sleeve 130 provided to receive a corresponding shaft axially retained by means of a snap ring (not shown) received in an inner groove 132 of sleeve 130. Plate 126 is integral with a shaft 134, the connection between the plate 126 and the shaft 134 being obtained by the intermediary of a disc-shaped portion 136 coaxial to shaft 134. The connection between plate 126 and disc 136 consists of reinforcing portions 138 which improve considerably the mechanical strength of the connection between plate 126 and shaft 134. Shaft 134 comprises splines provided to receive, for instance, the driving wheel of a vehicle.

As better shown on FIGS. 14 and 16, circular grooves 142 and 144 are machined in the opposite faces of plate 126, said grooves extending substantially along an angle of 180°. Similar grooves are machined at 146 and 148 respectively in the walls of arms 122 and 124 of fork 120. Four torque transmitting balls 150 are located in the aforesaid grooves. Fork 120 and plate 126 are connected by a spherical bearing surface carrying pin 152. Pin 152 comprises a head having two cylindrical steps 154 and 156. Cylindrical step 156 fits in a bore 157 provided in arm 122 of the fork and the portion 154 comprises a flat 158 cooperating with a shoulder 160 of arm 122 to oppose the rotation of the pin 152. It is obvious that the cylindrical head 154 which is provided with a flat 158 could be replaced by any convenient polygonal head, a hexagonal head, for instance.

The median portion of pin 152 comprises a substantially spherical bearing surface 162 cooperating with a cylindrical bore 164 provided in plate 126. The other end of pin 152 comprises a cylindrical portion 165 fitting in a corresponding bore provided through arm 124, said other end comprising a threaded portion designed to receive a nut 166 provided with means opposing the rotation of the nut. Said means opposing the rotation of the nut consist in the present example of a skirt having a small thickness which is serrated by a convenient tool to such as pliers into diametrally opposed longitudinal splines machined in threaded portion of pin 152.

Disc 136 comprised between plate 126 and shaft 134 not only improves the mechanical strength of the connection between the plate and the shaft, said disc is also used to provide support means for the end of an assembly constituting a protection casing opposing the entry of dirt into the joint and constituting a container for the lubricant in which operates the joint.

The casing forming sleeve made of rigid or semi-rigid material 170 coaxial with shaft 134 and disc 136 is mounted on said disc in tight sealing engagement therewith. The edge 172 of sleeve 170 is formed with a flange extending radially in close contact with the periphery of disc 136, the clamping of the sleeve on the disc being obtained by local serrations as shown at 174. The free end of sleeve 170 is inserted in the interior of the larger portion of a convoluted frusto-conical bellows 176 of a well-known type which is made of elastomeric material. The sealing cooperation between sleeve 170 and bellows 176 is obtained thanks to a clamping ring 178 located in a peripheral groove designed to receive said ring 178. The smaller end of bellows 176 is clamped in an annular groove of the internally splined sleeve 130 by means of a clamping collar 182 having a convenient width.

It is easily understood that the joint described hereinabove with reference to FIGS. 14 to 16 permits increasing of the transmitted torque without any increase of the size of the joint because of the provision of the reinforced portions 138 provided between the plate which is substantially semi-circular and disc. The provision of the disc to form a support for the sleeve and bellows also permits the obtainment of very good results since the volume of lubricant is substantially reduced and the deformation of the bellows are not very large at all angles of operation of the joint.

What I claim is:

1. A homokinetic universal joint comprising two shafts, a fork having a pair of spaced arms extending from one shaft, a plate extending from the other shaft and projecting between said spaced arms, grooves in the opposed faces of said spaced arms and in the faces of said plate, the axis of each groove, in a face of one of said arms intersecting the axis of a groove in the adjacent face of said plate, the points of intersection lying symmetrically in the plane which bisects the angle between the axes of said shafts and which includes the point of intersection of said axes, balls located between each arm of said pair of arms and the adjacent face of said plate, each said ball engaging in two grooves at the point of intersection of the axes thereof, at least a frontal slot near the free end of at least one of said plate and arms, said slot merging into at least one of the grooves and having a size permitting the introduction of the balls into their respective grooves.

2. A homokinetic universal joint comprising two shafts, a fork having a pair of spaced arms extending from one shaft, a plate extending from the other shaft and projecting between said spaced arms, grooves in the opposed faces of said spaced arms and in the faces of said plate, the axis of each groove, in a face of one of said arms intersecting the axis of a groove in the adjacent face of said plate, the points of intersection lying symmetrically in the plane which bisects the angle between the axes of said shafts and which includes the point of intersection of said axes, balls located between each arm of said pair of arms and the adjacent face of said plate, each said ball engaging in two grooves at the point of intersection of the axis thereof, a frontal slot on one face of the plate between the periphery thereof and one of the grooves, the depth of said slot being at least equal to the total of the depths of the grooves, said slot having a size permitting the passage of at least one ball therethrough.

3. A homokinetic universal joint comprising two shafts, a fork having a pair of spaced arms extending from one shaft, a plate extending from the other shaft and projecting between said spaced arms, grooves in the opposed faces of said spaced arms and in the faces of said plate, the axis of each groove, in a face of one of said arms intersecting the axis of a groove in the adjacent face of said plate, the points of intersection lying symmetrically in the plane which bisects the angle between the axes of said shafts, and which includes the point of intersection of said axes, balls located between each arm of said pair of arms and the adjacent face of said plate, each said ball engaging in two grooves at the point of intersection of the axes thereof, a frontal slot provided in the inner face of one of the arms of the fork between the periphery thereof and the respective groove, the depth of said slot being at least equal to the total of the depths of the grooves and said slot having a size permitting the passage of at least one ball therethrough.

4. A homokinetic universal joint comprising two shafts, a fork having a pair of spaced arms extending from one shaft, a plate extending from the other shaft and projecting between said spaced arms, grooves in the opposed faces of said spaced arms and in the faces of said plate, the axis of each groove in a face of one of said arms intersecting the axis of a groove in the adjacent face of said plate, the points of intersection lying symmetrically in the plane which bisects the angle between the axes of said shafts and which includes the point of intersection of said axes, balls located between each arm of said pair of arms and the adjacent face of said plate, each said ball engaging in two grooves at the point of intersection of the axes thereof, two slots being provided in the opposite faces of the spaced arms of the fork respectively, between the periphery thereof and each respective groove, said two slots taken together, having a total depth equal to the total of the depths of said grooves, the size of each of said slots permitting the passage of one ball therethrough.

5. A homokinetic universal joint comprising two shafts, a fork having a pair of spaced arms extending from one shaft, a plate extending from the other shaft and projecting between said spaced arms, grooves in the opposed faces of said spaced arms and in the faces of said plate, the axis of each groove in a face of one of said arms intersecting the axis of a groove in the adjacent face of said plate, the points of intersection lying symmetrically in the plane which bisects the angle between the axes of said shafts and which includes the point of intersection of said axes, balls located between each arm of said pair of arms and the adjacent face of said plate, each said ball engaging in two grooves at the point of intersection of the axes thereof, two slots being provided in the opposite faces of the fork respectively, between the periphery thereof and each respective groove, said two slots, taken together, having a total depth equal to the total of the depths of said grooves, the size of each of said slots permitting the passage of two balls, side by side, therethrough.

6. A universal homokinetic joint comprising a plate inserted in a fork, two balls on each side of the plate, each ball engaging in a groove in the plate and a groove in an arm of the fork, a central spherical pivot mounted on the fork being retained substantially centrally of the plate by means of a spherical seating adapted to withstand loads which tend to separate or close the parts of the joint, at least one frontal cutting or slot being provided at the periphery of at least one of the faces of the plate and/or the fork, said slot merging into at least one of the grooves and having a size permitting the insertion of the plate into the fork and the introduction of the balls in their respective grooves.

7. A homokinetic universal joint comprising two shafts, a fork having a pair of spaced arms extending from one shaft, a semi-circular plate connected by a reinforced portion to the other shaft and projecting between said spaced arms, grooves in the opposed faces of said spaced arms and in the faces of said plate, the axis of each groove, in a face of one of said arms intersecting the axis of a groove in the adjacent face of said plate, the points of intersection lying symmetrically in the plane which bisects the angle between the axes of said shafts and which includes the point of intersection of said axes, balls located between each arm of said pair of arms and the adjacent face of said plate, each of said ball engaging in two grooves at the point of intersection of the axes thereof, at least a frontal slot near the free end of at least one of said plate and arms, said slot merging into at least one of the grooves and having a size permitting the introduction of the balls into their respective grooves.

8. Universal joint as claimed in claim 7, wherein a disc coaxial to the shaft of the plate is solid with said reinforced portion, said disc sealingly engaging one end of a sleeve made of rigid or semi-rigid material which is coaxial to said disc and has its other end sealingly engaging one end of a flexible convoluted enclosure the other end of which sealingly engages the shaft of the fork.

9. Universal joint as claimed in claim 8, wherein said disc is of a diameter slightly larger than the maximum diametral size of the fork.

10. Universal joint as claimed in claim 8 wherein said sleeve is substantially cylindrical or slightly tapered and cooperates by serrations with the periphery of said disc.

11. Universal joint as claimed in claim 6 wherein said central spherical pivot is made in the form of a pin located between the two arms of the fork and which is affixed to one of said arms.

12. Universal joint as claimed in claim 11 wherein one of the ends of the pin comprises a shoulder and a threaded portion of smaller diameter on which is threaded a nut clamping the pin on one of the arms of the fork, the other end of said pin being cylindrical and having a diameter at least equal to the one of the spherical bearing portion carried by said pin to form said spherical pivot.

References Cited by the Examiner
UNITED STATES PATENTS

| | | | |
|---|---|---|---|
| 1,165,992 | 12/1915 | Marreck | 308—198 |
| 2,762,211 | 9/1956 | Bellomo | 64—21 |
| 3,184,927 | 5/1965 | Bellomo | 64—21 |

FRED C. MATTERN, JR., *Primary Examiner.*

H. C. COE, *Assistant Examiner.*